United States Patent
Saltzman

(10) Patent No.: US 9,314,889 B1
(45) Date of Patent: Apr. 19, 2016

(54) APPARATUS FOR HOLDING TUBULAR WORKPIECES

(71) Applicant: Michael J. Saltzman, Marseilles, IL (US)

(72) Inventor: Michael J. Saltzman, Marseilles, IL (US)

( * ) Notice: Subject to any disclaimer, the term of this patent is extended or adjusted under 35 U.S.C. 154(b) by 99 days.

(21) Appl. No.: 14/447,377

(22) Filed: Jul. 30, 2014

(51) Int. Cl.
*B25H 1/04* (2006.01)
*B23Q 3/18* (2006.01)
*B25H 1/00* (2006.01)
*B25H 1/02* (2006.01)

(52) U.S. Cl.
CPC .. *B23Q 3/18* (2013.01); *B25H 1/00* (2013.01); *B25H 1/02* (2013.01); *B25H 1/04* (2013.01)

(58) Field of Classification Search
CPC .............. B23Q 3/18; B25H 1/00; B25H 1/02; B25H 1/04; B25H 1/06
See application file for complete search history.

(56) References Cited

U.S. PATENT DOCUMENTS

| | | | | |
|---|---|---|---|---|
| 1,285,628 A * | 11/1918 | Craley | .................... | F16C 29/02 248/657 |
| 1,784,264 A * | 12/1930 | Young | ...................... | B25H 1/00 248/168 |
| 3,070,138 A * | 12/1962 | Baasland | ................. | B25H 1/04 108/158 |
| 4,135,691 A * | 1/1979 | Wiesmann | ........... | A47B 3/0809 108/129 |
| 4,196,897 A * | 4/1980 | Gordon | ................. | B25B 1/2405 269/157 |
| 4,244,253 A * | 1/1981 | Flanigan | ............... | B23D 59/00 144/135.2 |
| 4,502,518 A * | 3/1985 | Lewin | .................. | B23Q 9/0092 144/1.1 |
| 4,555,099 A * | 11/1985 | Hilton | ...................... | B25H 1/04 269/208 |
| 5,713,702 A * | 2/1998 | Turner | .................. | B23B 41/006 408/100 |
| 2005/0072493 A1 * | 4/2005 | Velasco | ..................... | B25H 1/04 144/286.1 |
| 2009/0273130 A1 * | 11/2009 | Armstrong | .............. | B25B 5/127 269/16 |
| 2013/0285302 A1 * | 10/2013 | Helm | ....................... | B25H 1/14 269/17 |

\* cited by examiner

*Primary Examiner* — Lee D Wilson
*Assistant Examiner* — Tyrone V Hall, Jr.
(74) *Attorney, Agent, or Firm* — Kelly & Krause, L.P.; W. Dennis Drehkoff

(57) ABSTRACT

An apparatus for holding tubular workpieces that can be separated and/or joined together with connectors. The apparatus is a portable platform that has a plurality of channels for holding tubular workpieces. The workpieces are placed in one or more channels and separated over an aperture in the platform. Connectors are placed on the ends of workpieces and are joined together to create a fluid tight joint by welding or heating to expand the workpieces into the connector.

12 Claims, 6 Drawing Sheets

APPARATUS FOR HOLDING TUBULAR WORKPIECES

BACKGROUND

Field of the Invention

The present invention relates to an apparatus that is suitable for use in the plumbing industry, more particularly, to an apparatus that is a platform for cutting or separating tubular workpieces. The apparatus also serves as a convenient platform for connecting tubular workpieces forming fluid tight seals.

The invention relates to an apparatus to improve the efficiency of a plumber working at a construction site. When a plumber is installing tubular workpieces for transporting water in a structure under construction, the need for cutting and joining workpieces takes priority because the plumber must conveniently bring the source of water from the water intake to the various places in the building where water is used. This involves cutting by blade or torch, if the workpieces are not precut, and joining the workpieces with connectors that may be T-shaped or elbow shaped for transporting water in the interior of the building, around various structures, through wood supports, etc, so that the water can reach its intended destination. The joint formed by the connector must be fluid tight.

At the construction site, the plumber usually uses spare wood or other construction materials to create a place for cutting the tubular workpieces and joining them with connectors. The makeshift arrangement of using wood to support the workpieces off the floor or ground while the connectors are being welded or expanded by heat to form a joint is hazardous because of the use of a torch for the cutting and welding. Searching for materials for creating a safe cutting and soldering area is time consuming.

There is a need for a portable platform that can be efficiently used to assist in the cutting and connecting of tubular workpieces, specifically at construction sites.

SUMMARY OF THE INVENTION

The present apparatus according to the principles of the present invention overcomes a number of shortcomings. In a preferred embodiment, the apparatus includes a platform with a plurality of channels for holding tubular workpieces. The workpieces can be separated and ends of the workpieces are joined together in a fluid tight seal. The workpieces are joined by the use of connectors which may be in a T-shaped or elbow shaped so the workpieces can be placed where desired in the building under construction.

To attain this, one embodiment of the present invention comprises a platform defined by a first continuous edge. In the platform there is an aperture with a second continuous edge. A plurality of channels have ends that meet the second continuous edge. First and second channels are aligned and opposed in a plane allowing tubular workpieces to be placed in the first and second channels and separated or cut over the aperture. The separating is performed by a blade or torch. The aperture optionally allows sufficient spacing off the floor or ground, if the platform is elevated, so that the blade or a torch does not damage nor inflame any object below the platform. The connectors can be T-shaped or elbow shaped or any other desired shape. There are provided additional channels, for example one or more perpendicular to the plane and one or more that are adjacent to opposed, aligned channels. Indeed, channels can be placed anywhere on the platform depending on requirements of the design of the tubular workpieces required to be cut and connected. The only requirement is that one end of the tubular work piece crosses the second continuous edge so it can be manipulated over the aperture. The ends of the workpieces are connected over the aperture. Manipulation means the cutting or joining the ends of the tubular workpieces with a connector.

It is therefore an aspect of the present invention to provide a new and improved apparatus for holding, and cutting tubular workpieces that has many advantages.

It is another aspect of the present invention to provide a new and improved apparatus for holding, cutting and joining ends of workpieces that is portable.

Still another aspect of the present invention is to provide a portable apparatus that provides a platform for holding. cutting and connecting workpieces that saves time of a plumber at the worksite.

Unless otherwise defined, all technical terms used herein are to be construed as having the same meaning as commonly understood by one of ordinary skill in the art to which this invention pertains.

There has thus been outlined, rather broadly, the more important features of the invention in order that the detailed description thereof that follows may be better understood, and in order that the present contribution of the art may be better appreciated.

Numerous other features and advantages of the present invention will be readily apparent to those of ordinary skill in the art upon reading of the following detailed description of presently preferred, but nonetheless illustrative, embodiments of the present invention when taken in conjunction with the accompany drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be made to the accompanying drawings and description matter in which there are illustrated embodiments of the invention.

BRIEF DESCRIPTION OF THE FIGURES

The invention will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION

The following detailed embodiments presented herein are for illustrative purposes. That is, these detailed embodiments are intended to be exemplary of the present invention for the purposes of providing and aiding a person skilled in the pertinent art to readily understand how to make and use of the present invention.

Accordingly, the detailed discussion herein of one or more embodiments is not intended, nor is to be construed to limit the metes and bounds of the patent protection afforded the present invention, in which the scope of patent protection is intended to be defined by the claims and their equivalents thereof. Therefore, embodiments not specifically addressed herein, such as adaptations, variations, modifications, and equivalent arrangements, should be and are considered to be implicitly disclosed by the illustrative embodiments and claims described herein and therefore fall within the scope of the present invention.

Additionally, it is important to note that each term used herein refers to that which a person skilled in the relevant art would understand such term to mean based on the contextual use of such term herein. To the extent that the meaning of a term used herein, as understood by the person skilled in the relevant art based on the contextual use of such term, differs in any way from any particular dictionary definition of such term, it is intended that the meaning of the term as understood by the person skilled in the relevant art should prevail.

Furthermore, a person skilled in the art of reading claimed inventions should understand that "a" and "an" each generally denotes "at least one," but does not exclude a plurality unless the contextual use dictates otherwise. And that the term "or" denotes "at least one of the items," but does not exclude a plurality of items of the list.

Figure 1:
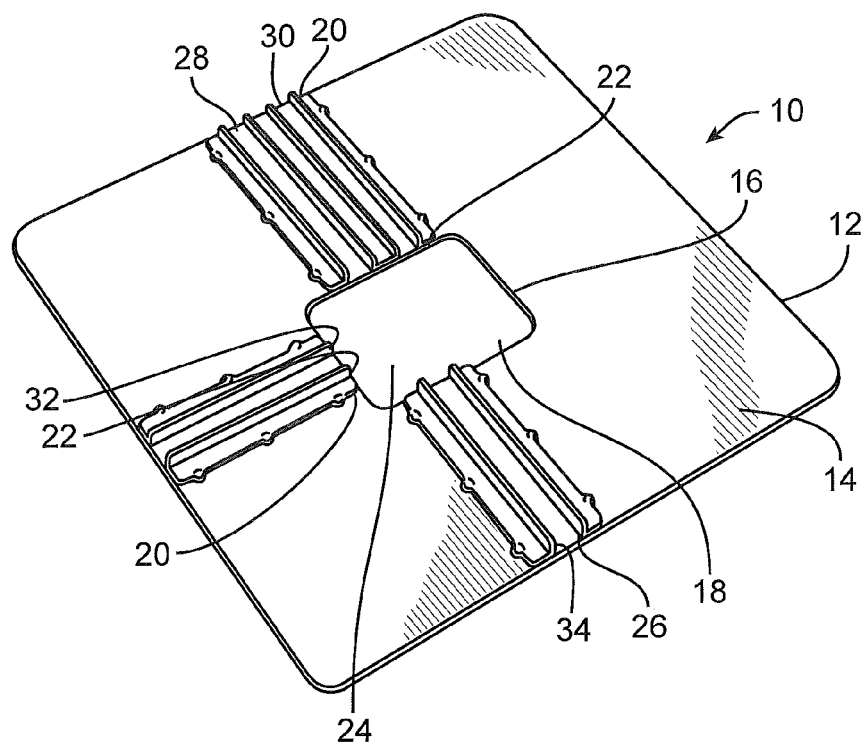
FIG. 1. is a perspective view of the apparatus according to one embodiment of the invention.
Figure 2:
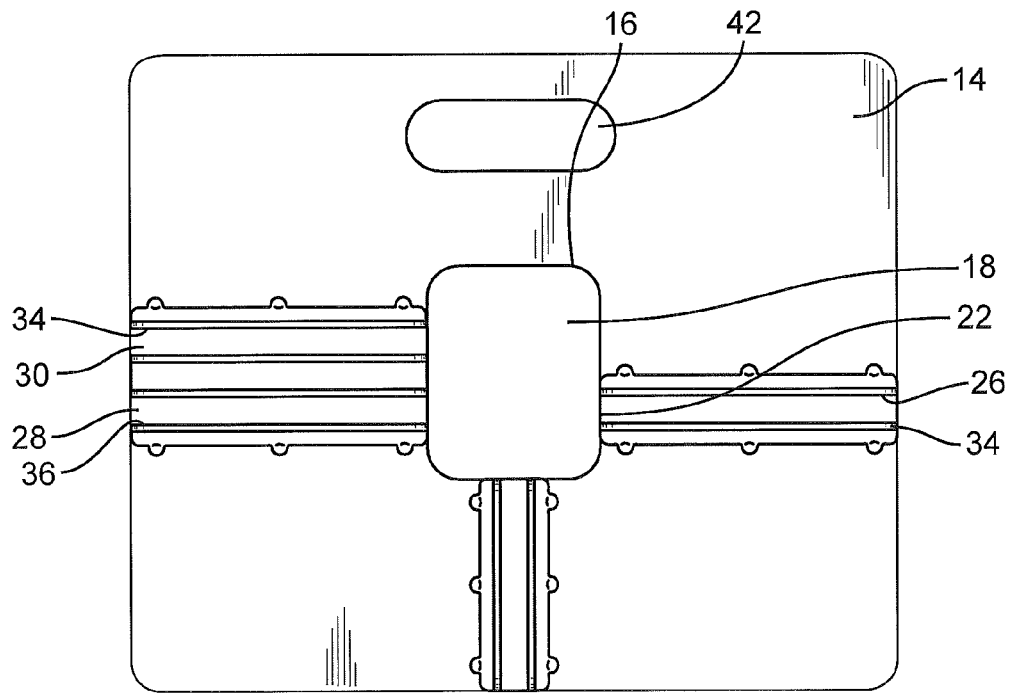
FIG. 2 is a top view of the apparatus of FIG. 1.

Referring now to the drawings, and in particular FIGS. 1 and 2 thereof, one embodiment of the present invention is shown and generally designated by the reference numeral 10. This embodiment of apparatus 10 has a first continuous edge 12 defining a platform 14. Platform 14 has a second continuous edge 16 defining aperture 18. There are a plurality of channels 20 with ends 22 that abut aperture 18. For a point of reference plane 24 passes through aperture 18. A first channel 26 abuts the second continuous edge 16. A second channel 28 opposes first channel 26 and is aligned with it and abuts the second continuous edge 16. A third channel 30 also opposes first channel 26 adjacent and parallel second channel 28 and abuts second continuous edge 16. A fourth channel 32 is perpendicular to plane 24 and abuts second continuous edge 28. The number of channels is not intended to be limiting. Any number of channels may abut the second continuous edge 16 and at any angle to the edge. The channels are generally U-shaped 34 as seen in FIG. 1. For fitting and holding tubular workpieces 38 channels 20 have linear side rails 36 for tubular workpieces 38. Channels 20 and side rails 36 are substantially adapted for receiving the outer contour 40 of the workpieces 38. Workpieces 38 are available in a variety of sizes and dimensions defined by length and diameter. The workpieces can be separated by blade on a saw or by the flame of a torch. They are made from metal, or any metal suitable for transporting fluids, preferably copper. The separation takes place over aperture 18 so as not to damage the surface of platform 14, which is preferably elevated from the floor, ground or other supporting surface and distanced from objects that could be incinerated by the torch. Platform 14 is made preferably from metal and also can be made from a resilient, tough, thermoplastic material, one that withstands high temperatures generated by the torch.

FIG. 2 shows a second aperture 42 that may serve as a handle for transporting the portable platform 14. Other types of handles are suitable, for example, one that attaches to first continuous edge 12 or one that is connected to the surface of platform 14.

Connectors 44 are utilized for joining ends of tubular workpieces 38 secured in channels 20 allowing for the configuration of the tubing so that the fluid can travel in the workpieces around obstacles, preferably in a building being constructed at a work site. There are various shapes of connectors, for example, T-shaped 46, elbow shaped 48 and double elbow shaped 50 as seen in FIGS. 3-8.

Figure 3:
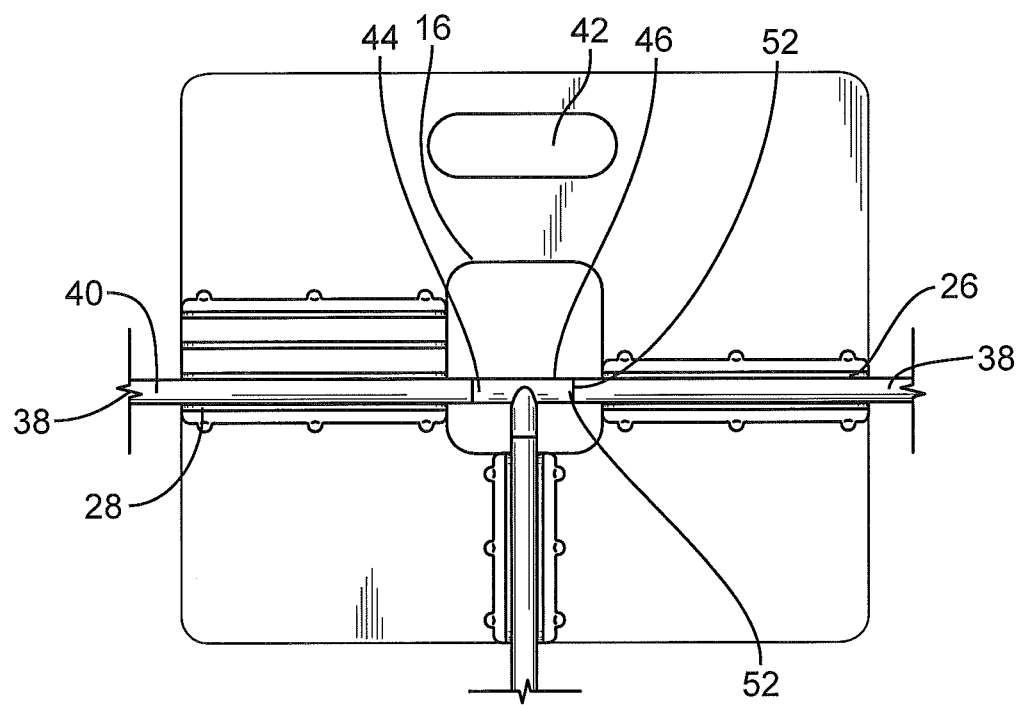
FIG. 3 is a top view of the apparatus of FIG. 1 with a T-shaped connector joining three ends of tubular workpieces, all of which are secured in separate channels.

FIG. 3 shows T-shaped connector 46 creating a fluid tight seal on two ends of tubular workpieces 38 in first channel 26 and second channel 28 and fourth channel 32 which is perpendicular to plane 24 and the opposed workpieces 38 and ends 52 thereof. Channels 26, 28 and their two ends are aligned with ends 52 of workpieces 38 in plane 24.

Figure 4:
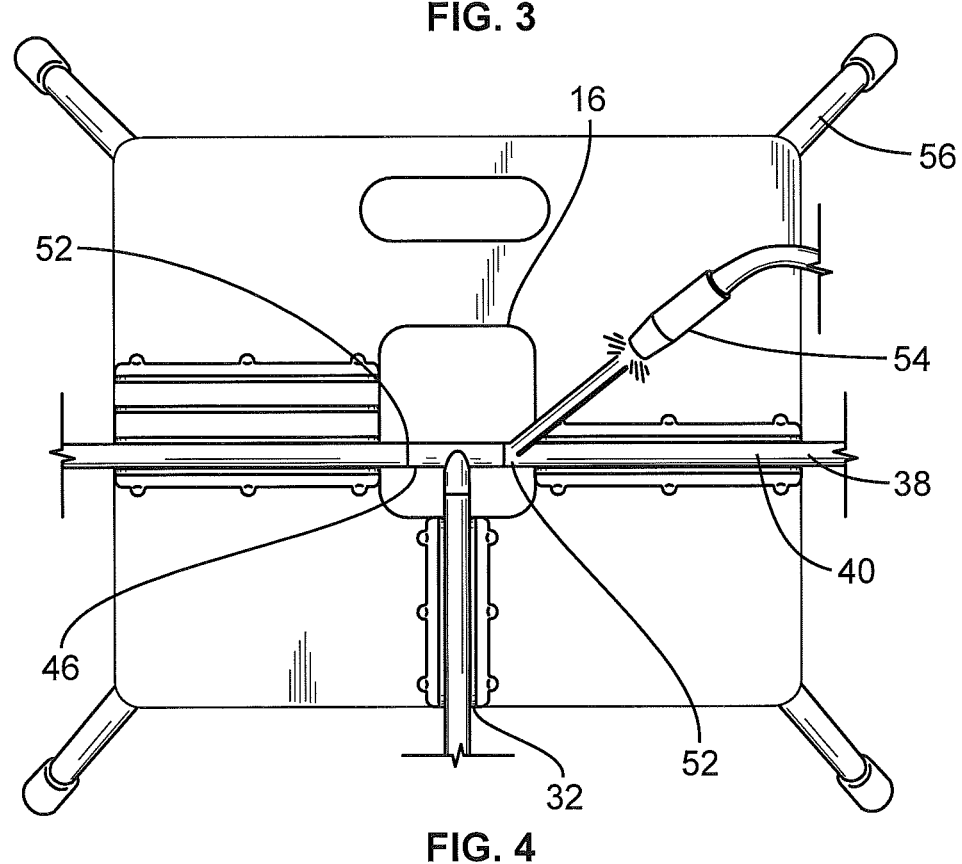
FIG. 4 is a top view of the apparatus according to one embodiment of the present invention showing the apparatus having legs and a torch welding a T-shaped connector to one end of a tubular workpiece secured in a channel.

FIG. 4 shows torch 54 applying heat to solder T-shaped connector to workpieces 38. The heat may also be applied to sweat or expand the portion of the metal workpieces inside the T-shaped connector 46.

Figure 5:
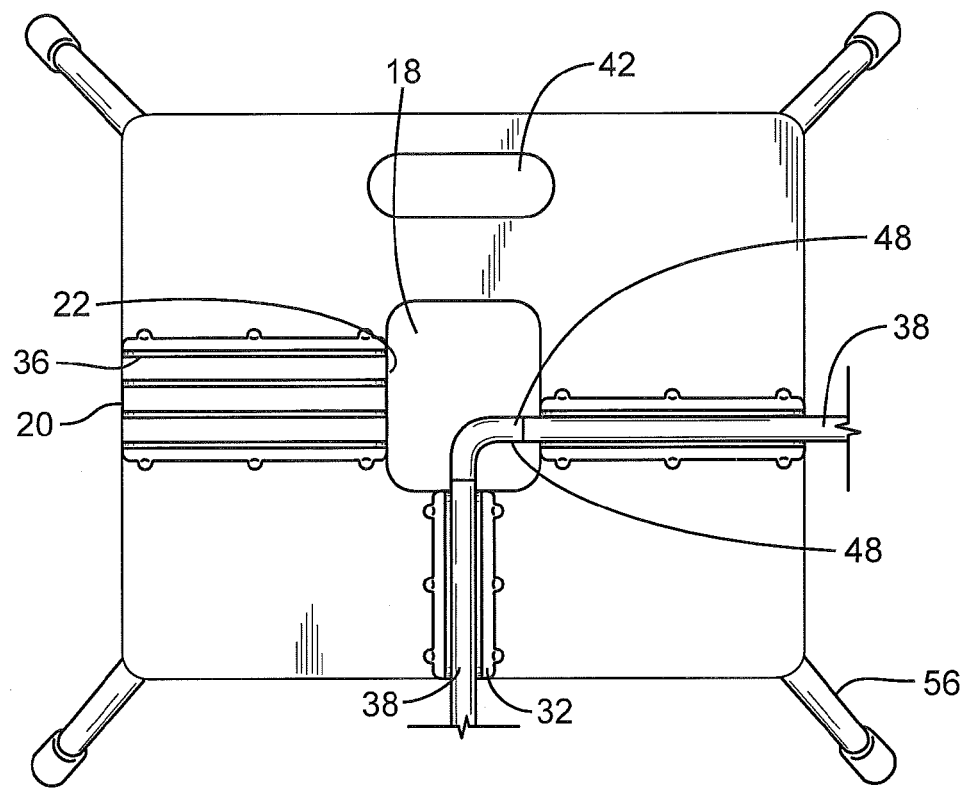
FIG. 5 is a top view of the apparatus according to one embodiment of the invention wherein an elbow joint connects two ends of tubular workpieces at a 90 degree angle, the workpieces secured in channels.

FIG. 5 shows elbow connector 48 joining workpiece 38 in first channel 26 and another workpiece 38 in fourth channel 32. Legs 56 are also shown. Legs can be permanently mounted or adjusted as shown with legs 56. Legs 56 raise platform 14 off the floor or ground providing a safe distance for the use of torch 54 over aperture 18 so that materials below the platform are not incinerated.

Figure 6:
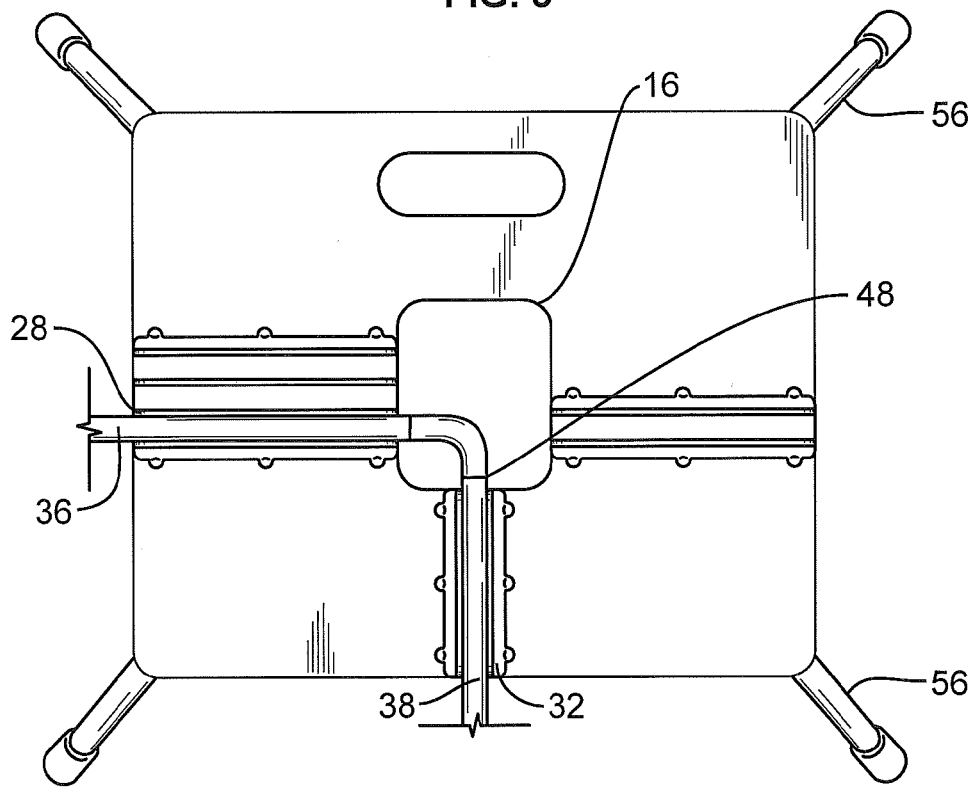
FIG. 6 is a top view of the apparatus according to one embodiment of the invention wherein the elbow joint connects two ends of tubular workpieces at a 90 degree angle on the left side, the workpieces secured in channels.

FIG. 6 illustrates another elbow connector 48 joining workpiece 38 from fourth channel 32 to workpiece 38 in second channel 28.

Figure 7:
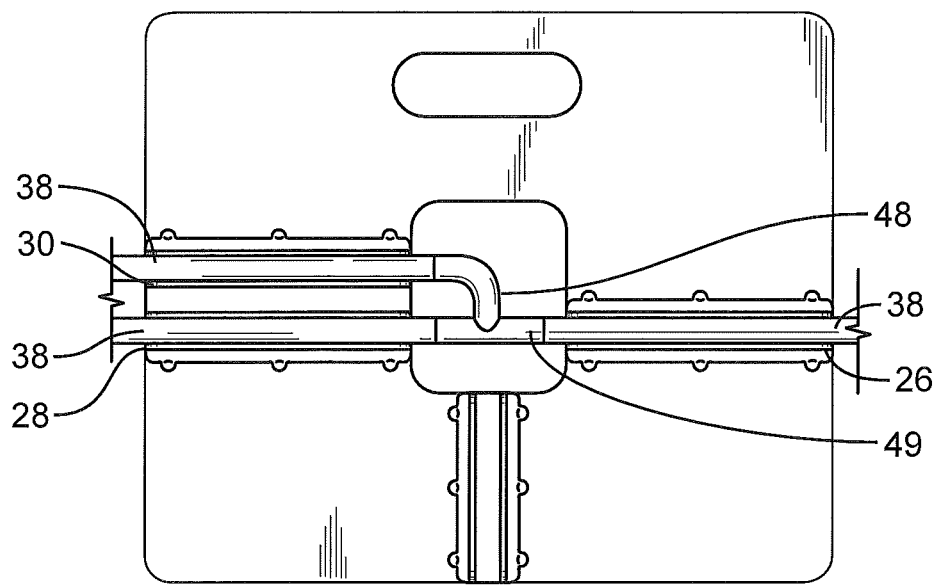
FIG. 7 is a top view of the apparatus according to one embodiment of the invention wherein an elbow joint is combined with a T-shaped joint connecting three ends of tubular workpieces secured in channels.

FIG. 7 shows elbow connector 48 connected to a straight connector 49 joining workpieces 38 in first channel 26, second channel 28 and another workpiece 38 in third channel 30.

Figure 8:
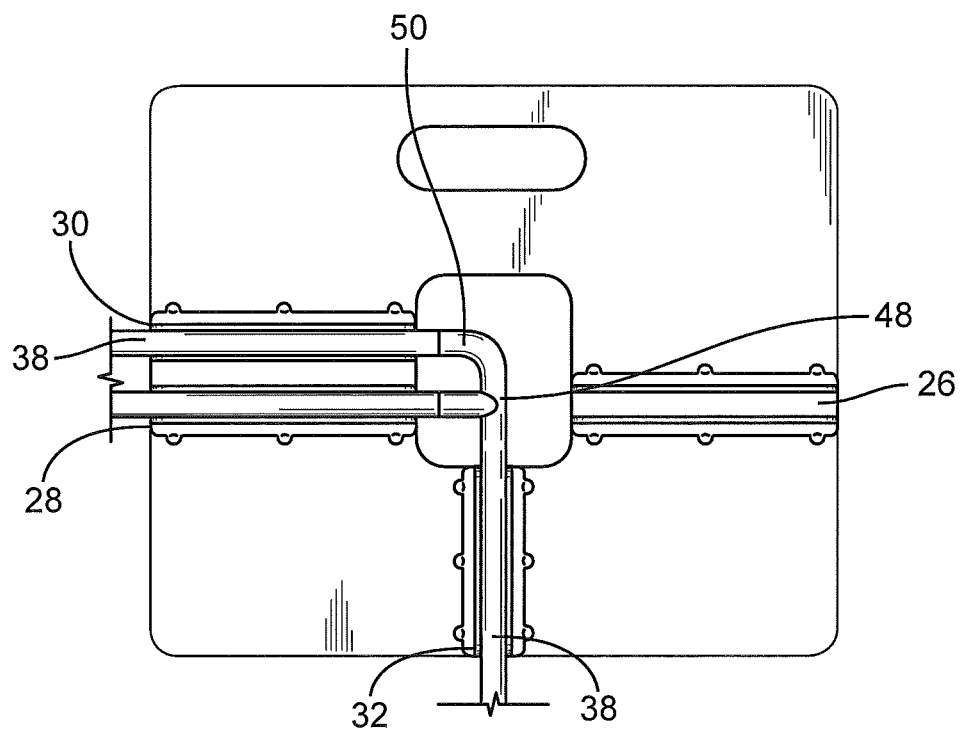
FIG. 8 is a top view of an elbow connector having a second connector for joining three ends of tubular workpieces.

FIG. 8 shows double elbow connector 48 joining workpiece 38 in fourth channel 32 with workpieces in second channel 28 and third channel 30

Figure 9:
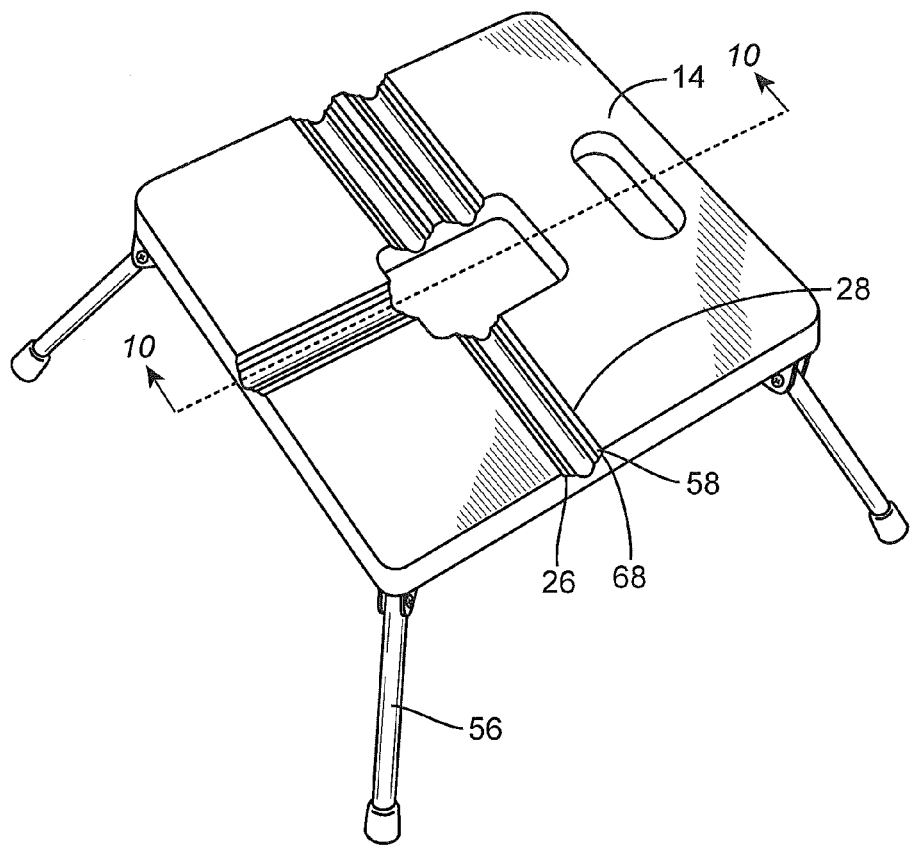
FIG. 9 is a perspective view of the apparatus according to one embodiment of the present invention having steps in the U-shaped channels.
Figure 10:
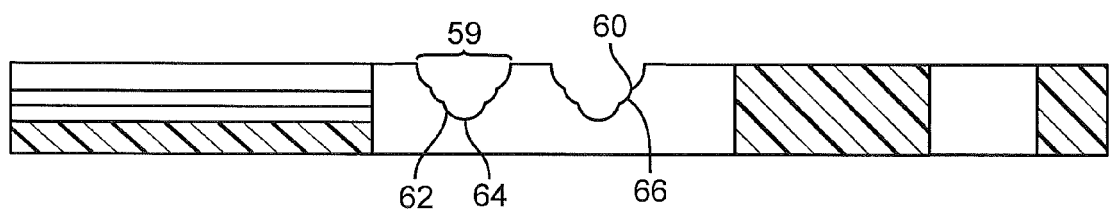
FIG. 10 is a cross section at line 10-10 of FIG. 9 showing steps in channels.

FIG. 9 shows apparatus 10 with platform 14 being supported by legs 52. A plurality of steps 59 is shown in all the channels. There are three steps, preferably, however, any number of steps suitable for the U-shape 34 may be utilized in channels 20 for holding tubular workpieces of various dimensions. With reference to FIGS. 9 and 10, first channel 26, step 58 is the largest diameter. Step 60 is of a medium diameter and step 62 is of the narrowest diameter relative to the others. The diameters match diameters and dimensions of workpieces 38 so that various workpieces will fit within the various channels in a secure manner. The smallest diameter workpiece fits in the smallest diameter step 62 in the lowest point 64 of second channel 28. A medium diameter workpiece, relative to the other diameters, fits step 60 at mid-point 66 of third channel 30. The largest diameter workpiece, relative to the other diameters, fits step 58 at top point 68. The fitting is accomplished by pressing the work piece of the proper dimension into the corresponding step and location in U-shaped 34 as shown in first channel 26. Steps 58, 60 and 62 are found in all U-shaped 34 channels 20 in platform 14. Channels 20 may have linear sidewalls 36 or a plurality of steps 59 or a combination of both for securing tubular workpieces 38.

Figure 11:
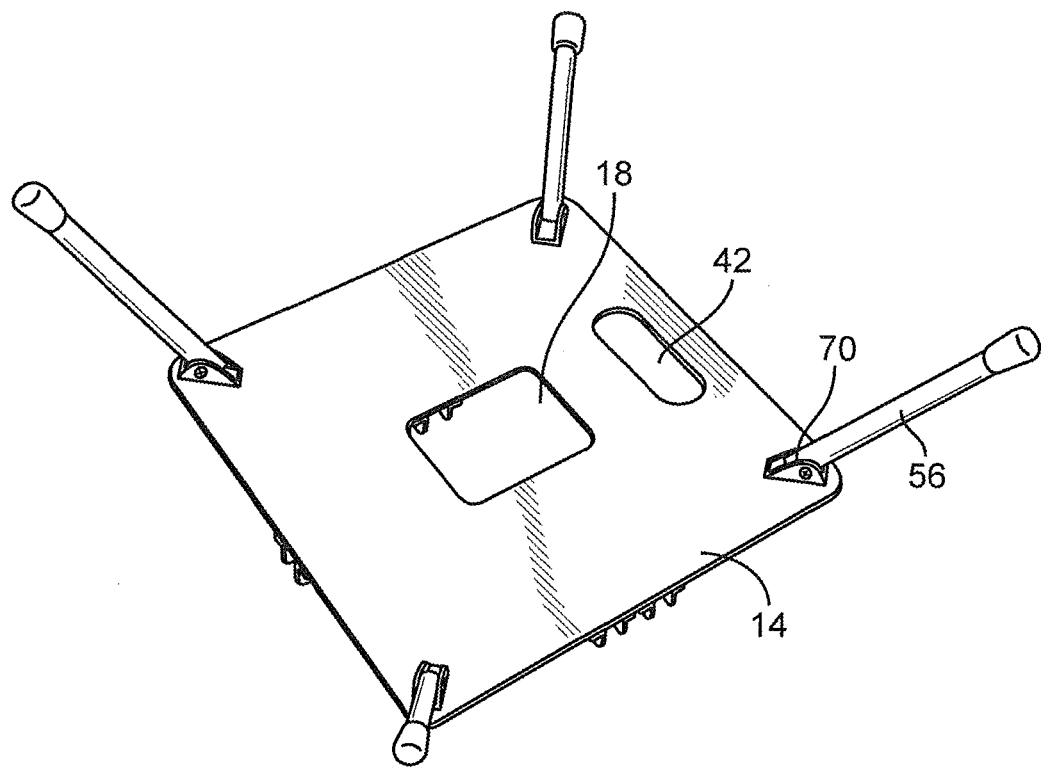
FIG. 11 is a perspective view of the underside of the apparatus according to one embodiment of the present invention showing attachment devices for folding legs under the apparatus.
Figure 12:
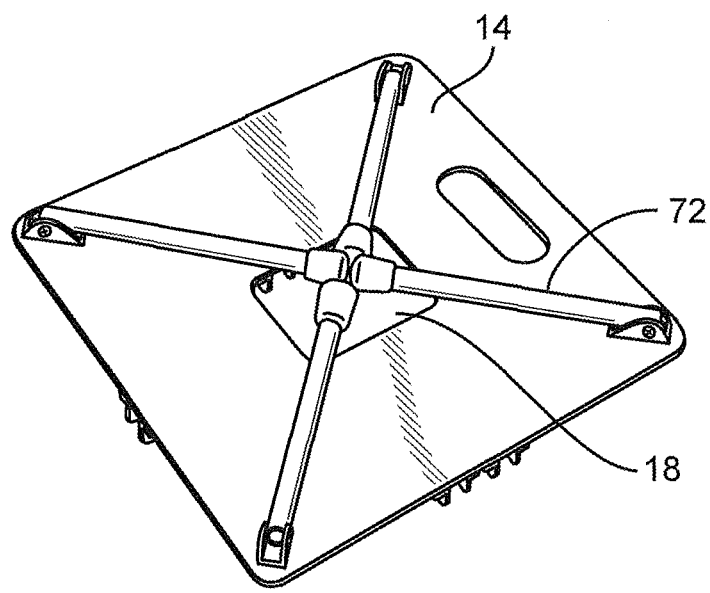
FIG. 12 is a perspective view of the underside of the apparatus according to one embodiment of the present invention wherein the legs are in a folded position.

FIG. 11 shows inverted platform 14 with foldable legs 56 in an open position. Joint 70 allows legs 56 to rotate to a folded position 72 as seen in FIG. 12 for storage and transport. Legs 56 are preferred and foldable legs are most preferred, however other types of legs or support may also be used with apparatus 10.

While a number of embodiments of the apparatus have been described in detail, it should be apparent that modifications and variations thereto are possible, all of which fall within the true spirit and scope of the invention. With respect to the description above, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. An apparatus for holding tubular workpieces for manipulation comprising:
 a platform defined by a first continuous edge,
 an aperture in the platform defined by a second continuous edge,
 a central plane pass through the aperture,
 a first channel abutting the second continuous edge along the plane,
 a second channel opposed to and aligned with the first channel abutting the second continuous edge,
 a third channel opposed to the first channel adjacent the second channel abutting the second continuous edge, and
 a fourth channel perpendicular to the plane abutting the second continuous edge,
 wherein the rod-shaped and tubular workpieces fit within the channels and are secured for manipulation.

2. The apparatus according to claim 1 wherein the channels are substantially U-shaped.

3. The apparatus according to claim 1 wherein the channels have linear sidewalls.

4. The apparatus according to claim 1 wherein the channels have plurality of steps for holding rod-shaped and tubular workpieces of varying dimensions.

5. The apparatus according to claim 4 wherein each step of a plurality of steps is substantially adapted to the outer contour of a tubular workpiece.

6. The apparatus according to claim 1 wherein one piece tubular workpiece extending from the first channel to the second aligned channel across the aperture can be separated in the aperture.

7. The apparatus according to claim 6 wherein the ends of the tubes are attached by welding or expanded into connectors.

8. The apparatus according to claim 6 wherein separation of tubular workpiece means cutting the one piece rod-shaped and tubular workpiece by a blade or torch.

9. The apparatus according to claim 1 wherein a connector is utilized to attach an end of a tubular workpiece to another end of a tubular workpiece yielding a fluid tight joint.

10. The apparatus according to claim 9 wherein the connector that forms a fluid tight seal is the same material or substantially the same material as the rod-shaped and tubular pieces.

11. The apparatus according to claim 9 wherein a connector is utilized to form T-shaped or elbow-shaped fluid tight joint to tubular workpieces.

12. An apparatus for holding tubular workpieces comprising;
 a platform defined by a continuous edge,
 an aperture defined by a second continuous edge,
 a plurality of channels having one end that abuts the second continuous edge, so that the channels can hold a tubular workpiece, the channels being separated or joined across the aperture.

* * * * *